Oct. 17, 1933.   M. H. GYSLING   1,931,465
CONDUIT
Filed Jan. 21, 1930   3 Sheets-Sheet 1
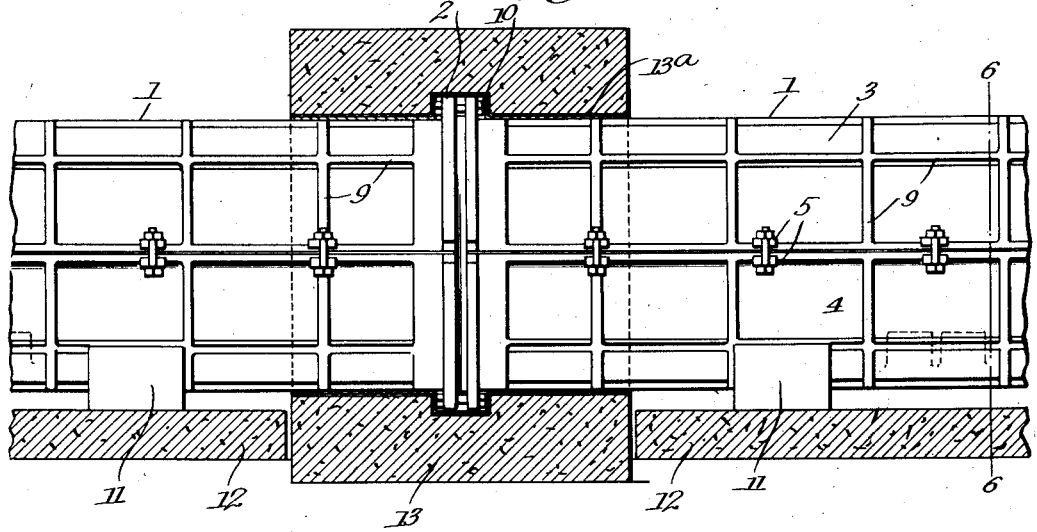
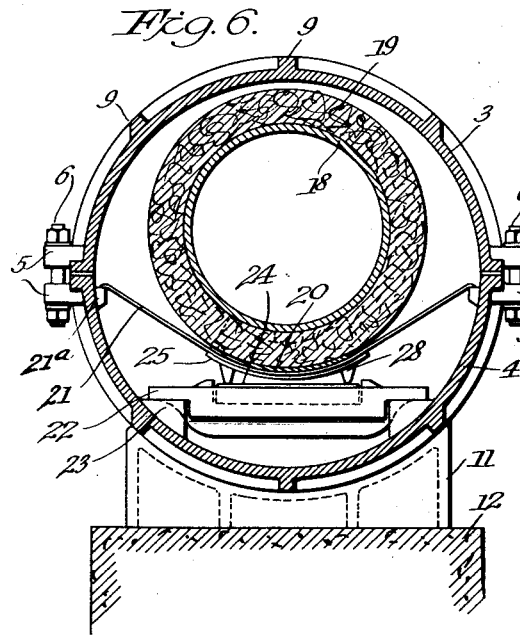 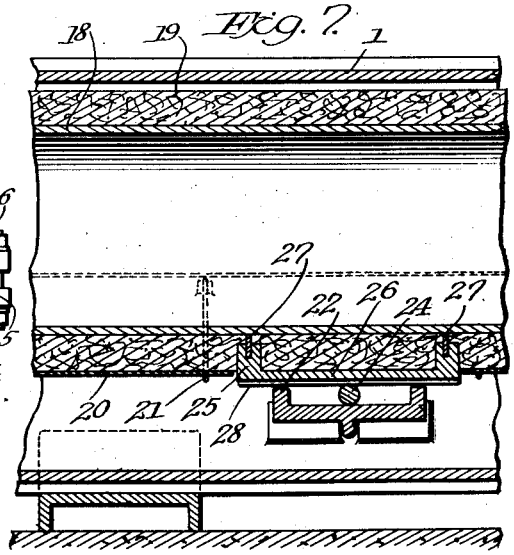
Inventor
M. H. Gysling
By Morrison, Kennedy & Campbell
Attorneys Oct. 17, 1933.  M. H. GYSLING  1,931,465
CONDUIT
Filed Jan. 21, 1930  3 Sheets-Sheet 2
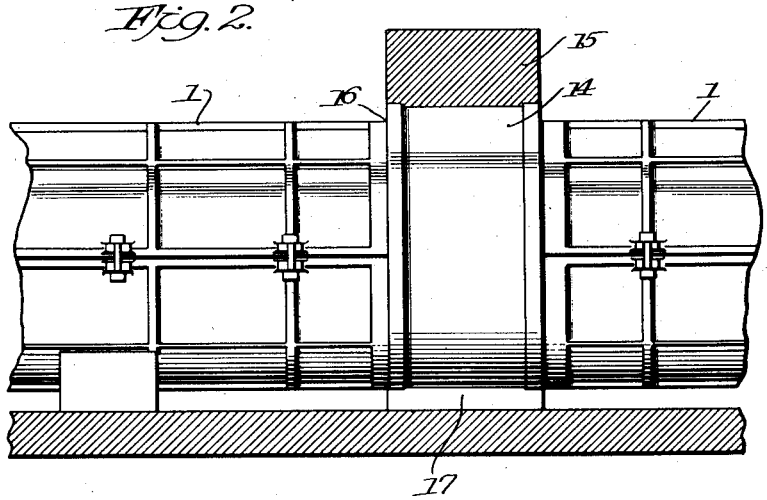
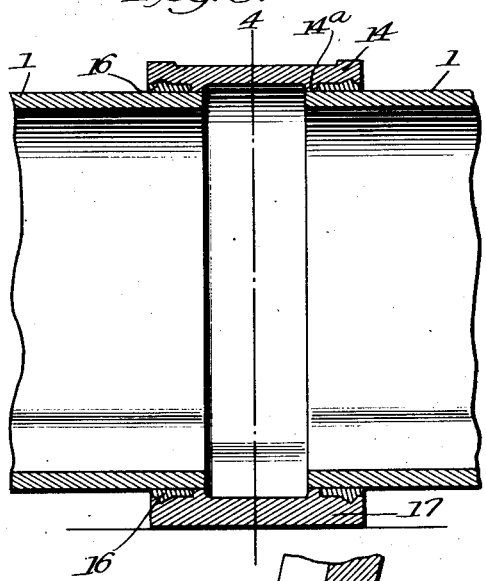
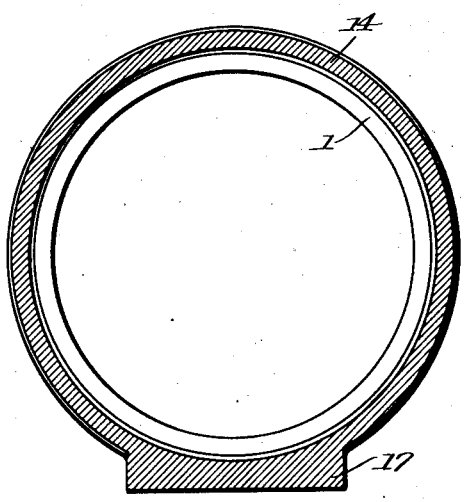
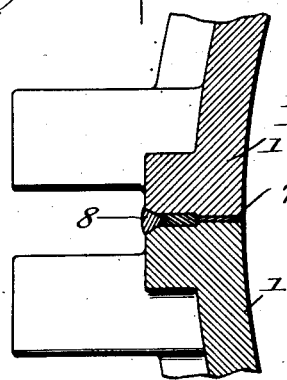
Inventor
M. H. Gysling
By Morrison, Kennedy Campbell
Attorneys Oct. 17, 1933.    M. H. GYSLING    1,931,465
CONDUIT
Filed Jan. 21, 1930    3 Sheets-Sheet 3

Inventor
M. H. Gysling
By Morrison, Kennedy Campbell
Attorneys

Patented Oct. 17, 1933

1,931,465

UNITED STATES PATENT OFFICE 1,931,465

CONDUIT

Manuel H. Gysling, North Tonawanda, N. Y., assignor to American District Steam Company, North Tonawanda, N. Y., a corporation of New York Application January 21, 1930. Serial No. 422,431

8 Claims. (Cl. 137—75)

This invention relates to conduits and, more particularly, to a type of conduit for housing steam pipes and the like.

The principal object of the invention is to improve, generally, the construction of conduits of the character set forth with a view to providing a strong, durable construction in which provision is particularly made for accurate mounting of the several parts which will not be disturbed by reason of the expansion and contraction of the pipe or the conduit.

Another object of the invention is to provide, in a conduit of the character set forth, means for supporting a steam pipe or the like therein in such a manner as to permit the free expansion of the pipe under the influence of changing temperature.

A further object of the invention is to provide a conduit, preferably of metal such as cast iron, with means for compensating the expansion and contraction of the conduit under the influence of changing temperature.

A further object of the invention is to provide in a conduit for housing steam pipes and the like, means for connecting the steam pipe and the conduit in such a manner that equal distribution of the expansion of the enclosed pipe is obtained, the said means being located, preferably, between suitable expansion joints in the pipe.

Still another object of the invention is to provide means for accurately aligning a steam pipe and the like within a conduit in such a manner that there may be a true and straight movement of the pipe into an expansion joint during the expansion and contraction of the pipe.

Still another object of the invention is to provide, in a conduit for housing steam pipe and the like, means for supporting the usual insulation around the pipe so as to prevent sagging of said insulation in the event that the same becomes heavy due to the absorption of moisture.

Other and further objects of the invention and its many advantages will be more clearly brought out as the description proceeds.

In the accompanying drawings, I have illustrated what I at present consider the preferred embodiment of my invention. It is to be understood, however, that these drawings are illustrative, merely, and that the invention is not confined to the details of construction therein disclosed, but may be varied widely without sacrificing any of its salient features or departing from the scope thereof as defined in the appended claims.

In these drawings:

Fig. 1 is a view in side elevation of a portion of a conduit constructed in accordance with my invention;

Fig. 2 is a view in side elevation, similar to Fig. 1, and showing particularly the means I have provided for compensating for expansion of the conduit;

Fig. 3 is a detailed view in vertical cross section of the conduit expansion sleeve;

Fig. 4 is a side elevation of the conduit expansion sleeve;

Fig. 5 is a fragmentary sectional view showing the manner of joining the upper and lower sections of the conduit;

Fig. 6 is a view in vertical cross section through the conduit, on the line 6—6 of Fig. 1, showing particularly the mounting of a steam pipe therein;

Fig. 7 is a view in longitudinal cross section of the portion of the structure illustrated in Fig. 6;

I prefer to construct the conduit constituting the subject-matter of the present invention of cast iron because of the superiority of that material over terra-cotta and concrete conduits heretofore generally devised for my purposes. An objection heretofore existing with respect to conduits made of cast iron is the difficulty of compensating for the expansion of the conduit under varying temperature conditions. My invention provides means for compensating for that expansion and thus I have removed what is perhaps the most serious objection to the use of cast iron in the construction of conduits of this character.

Figure 10:
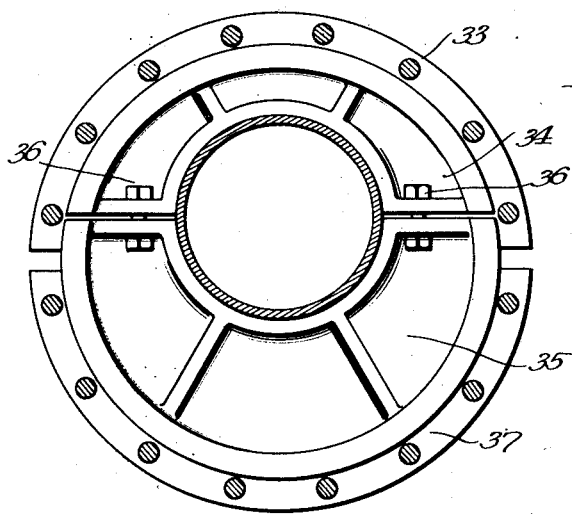
Fig. 10 is a view in elevation of an anchoring ring constructed in accordance with my invention.

Referring now to the drawings, the conduit is constructed of a plurality of sections 1, each provided at its ends with flanges 2, 2 and composed of an upper half-section 3 and a lower half-section 4. From an inspection of Figures 1 and 10, it will be seen that the flanges 2 do not extend all the way to the horizontal joint between the half-sections, but terminate a sufficient distance from that joint so that it may be caulked, as hereinafter more fully described.

Each of the half-sections 3 and 4 is provided, at suitably spaced points in its length, with bolting lugs 5 for the reception of suitable bolts 6 by means of which the half-sections are held together and in alignment during assembly of the conduit. After the flanged ends of the conduit are bolted together and the expansion sleeves and the horizontal joint are caulked, the bolts 6 have served their purpose and are no longer needed.

For the purpose of providing a tight joint between the half-sections and thus prevent seepage of moisture into the conduit, a suitable longitudinal gasket 7 is interposed between the sections along their inner edges. The outside of the horizontal joint is caulked by a lead strip, as at 8, to provide a flexible joint of sufficient thickness to absorb the circumferential expansion of the conduit and also to provide for unequal longitudinal expansion of the half-sections due to the fact that the upper half-section is subjected to a higher degree of temperature than the lower half-section. It will be noted from an inspection of Figure 5 that the recess provided for the lead strip 8 makes a shoulder adjacent to the outside line of the gasket 7, thereby forming a stop for the lead strip while caulking to prevent distortion of the water-tight gasket joint at that time.

The outer surface of the conduit is provided with suitably arranged reinforcing ribs 9. It will be understood that the conduit may be constructed of any number of sections, the adjacent sections being secured together by suitable bolts 10 passing through the abutting flanges 2, 2.

The conduit is preferably, and as shown, supported by suitable saddles 11, which are secured in a concrete base 12. At suitable intervals in the length of the conduit and at the points therein where anchoring means are provided for securing the enclosed pipe to the conduit, as will hereinafter be more fully described, the conduit is encased in large reinforced concrete blocks 13 (see Figure 1), which blocks are suitably spaced from the base 12 so as to provide for expansion of the concrete. At these points, where the conduit is encased in the concrete blocks, it is wrapped with heavy paper 13a, thus permitting expansion of the conduit.

Provision is also made for compensating for longitudinal expansion and contraction of the conduit. For this purpose certain sections of the conduit, at regular intervals in the length thereof, are mounted to telescope in an expansion sleeve 14 (see Figure 2) which, preferably, is encased in a concrete block 15. Suitable lead and oakum joints 16 are provided between the sections of the conduit and the expansion sleeve so that there may be no leakage at the end joints of the conduit. The expansion sleeve 14 is illustrated in detail in Figures 3 and 4 and by reference to these figures, it will be seen that the sleeve comprises a ring member which is provided at its base with a flat portion 17 so that it may securely rest on the concrete base 12. The ring member 14 is machined on the inside, or bore, for the purpose of providing bearing or sliding surfaces 14a for the machined spigot of the conduit and also for the purpose of acting as a stop for the lead caulking.

The foregoing description of the construction of the conduit, it is believed, will make the subject-matter of my invention clear to those skilled in the art and the features of advantage of my construction will be readily apparent and appreciated.

Proceeding now to the interior of the conduit and particularly to the means for supporting a steam pipe or the like therein, attention is first directed to Figure 6 of the drawings. In this figure the reference numeral 18 designates a steam pipe or the like which is provided with a suitable heat insulating covering 19. It is well known that in pipes of this character which are provided with the usual type of heat insulating coverings, the covering often sags due to the absorption of moisture within the conduit, the result being that the insulation is, by reason of the additional weight, compressed on the upper part of the pipe and sags or is pulled away at the lower part. To overcome this common defect, I have provided a non-corrodible metal shield 20, which extends continuously below the pipe and which, at suitable points in the length thereof, is supported by means of wires or bands 21 secured to lugs 21a provided on the inside of the lower half-section of the conduit and immediately below its top surface. It will, of course, be understood that I do not limit my invention to a shield made of metal, but that on the other hand any other suitable material, which is non-corrodible and which is otherwise unaffected by heat and moisture, may be employed for this purpose. This is an important feature of my invention and solves successfully a problem long existing in the art.

At suitable points in the length of the conduit, I have provided means for supporting the steam pipe in such a manner that the pipe is free to move during expansion or contraction. This means comprises a roller support 22 which is mounted on suitable lugs 23 extending inwardly within the conduit. Upon this roller support rests a roller 24. The pipe is provided with a saddle 25 which rides on the roller 24 so that the pipe may freely move during expansion and contraction. The saddle 25 comprises a body portion 26 and a pair of wing members 27 which are welded to the pipe. This part of my construction will be clear by reference to Fig. 7. It is to be noted that because of this construction I do not have to cut away the insulation to provide sufficient space for movement of the pipe as in those cases where the pipe rests directly on the roller. To overcome friction, the saddle is provided with flanges 28 which are in direct contact with the roller 24.

Figure 8:
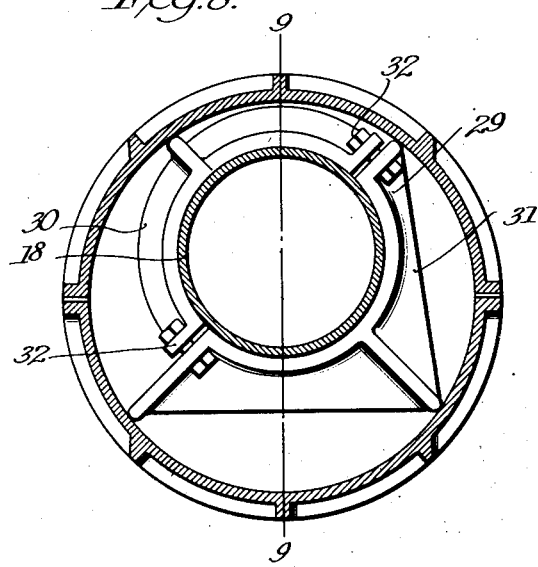
Fig. 8 is a sectional view through the conduit showing, in elevation, the construction of an alignment guide.
Figure 9:
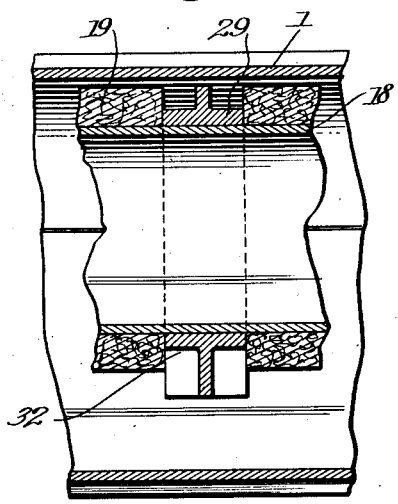
Fig. 9 is a longitudinal sectional view on line 9—9 of Fig. 8.

In a structure of this nature, it is essential that the pipe be supported within the conduit in such a way as to permit true and straight movement of the pipe into its expansion joints. For the purposes of the present application, I have deemed it unnecessary to illustrate any expansion joints, it being understood that such joints will be provided at suitable points in the length of the pipe line and that they may be of any well-known construction. I have however, illustrated one form of means by which I am enabled to maintain the pipe line in true alignment and the construction of this means will be clear from an inspection of Fig. 8. This means comprises an alignment guide ring indicated, generally, by the reference numeral 29, composed of two sections 30 and 31 which are flat and are provided with a collar for engaging the pipe and a plurality of outstanding radial ribs, the sections being secured together by suitable bolts 32. It will be understood that this alignment guide is clamped tightly about the pipe 18 by adjustment of the bolts 32 and that the ribs extend beyond the flat portions of the guide sections 30 and 31 and provide fine points of contact with the interior of the conduit at spaced circumferential points so that there will not be excessive friction during the movement of the pipe line.

Figure 11:
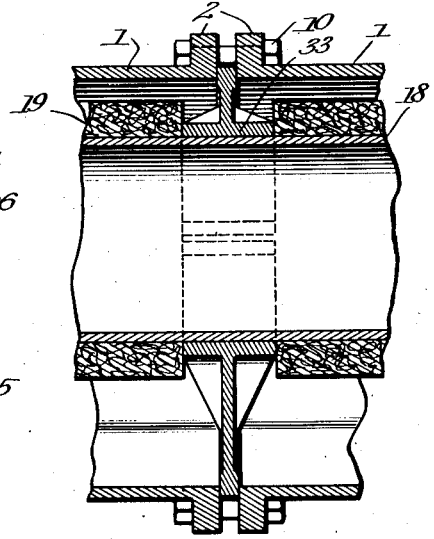
Fig. 11 is a fragmentary sectional view showing the anchoring ring of Fig. 10 mounted in position in the conduit.

As above stated, a suitable number of expansion joints of any well-known construction will be inserted at intervals in the length of the pipe. It is, of course, essential that the expansion of the pipe line should be equally distributed to these expansion joints and for this purpose I have provided an anchoring ring designated, generally, by the reference character 33 and which is illustrated in detail in Figs. 10 and 11. The purpose of the anchoring ring is to secure the pipe line to the conduit. As will be clear from an inspection of Fig. 10, the anchoring ring 33 comprises two sections 34 and 35, which are secured together by means of bolts 36. The sections of the anchoring ring are provided with a machined flange 37 which, as will be seen from an inspection of Fig. 11, is clamped between the flanges 2, 2 of adjacent sections of the conduit and securely held in place by means of the bolts 10. Thus, the pipe 18 is anchored to the conduit and, at this point, as is shown in Fig. 1, the conduit is embedded in the reinforced concrete block 13. It will be understood that the anchoring rings are located approximately midway between expansion joints of the pipe line, and it will be apparent from the construction described that the expansion of the pipe line will be equally distributed to the joints on either side of the anchoring ring.

It is believed that the foregoing description will make clear the construction and operation of my invention. It will be seen that I have provided a conduit, preferably of cast iron, for housing steam pipes and the like, provision being made for compensation for the expansion and contraction of the conduit as a whole, as well as the upper and lower half-sections together with the pipe therein. I have also provided means for equally distributing such expansion and contraction. Furthermore, I have provided novel means for supporting and anchoring a steam pipe and the like within conduits together with novel means for lending additional support to the heat insulating covering usually employed on such pipe. The structure is, generally speaking, of simple design and lends itself readily to practical installation where field conditions are unusually difficult to cope with. To simplicity of design may be added the advantages of strength and durability which are, of course, desirable characteristics of a structure of this nature designed for the purposes indicated.

What I claim is:

1. A coduit for steam pipes and the like, a pipe in said conduit, an anchoring ring secured between the ends of adjacent sections of the conduit rigidly connecting said pipe to said conduit, and an alignment ring carried by said pipe and slidable in said conduit for maintaining said pipe in accurate alignment with respect to said conduit.

2. A conduit for steam pipes and the like comprising a plurality of metallic sections, each of said sections being longitudinally divided into a plurality of complementary part-sections, said complementary sections being independently expansible with respect to each other, and an expansion member connecting certain of said sections permitting expansion of the part-sections independently of each other.

3. A conduit for steam pipes and the like comprising a plurality of metallic sections, each of said sections being longitudinally divided into a plurality of complementary part-sections, said complementary sections being independently expansible with respect to each other, and means rigidly connecting adjoining part-sections of certain of said sections independently of each other.

4. A conduit for steam pipes and the like comprising a plurality of metallic sections, each of said sections being longitudinally divided into a plurality of complementary part-sections, said part-sections being independently expansible with respect to each other, a pipe in said conduit, and an alignment ring having a plurality of outstanding portions making fine points of frictional contact circumferentially of the conduit secured to said pipe contacting with and slidable with respect to the plural part-sections for maintaining the pipe in alignment with said conduit.

5. A conduit for steam pipes and the like, comprising a plurality of sections, a pipe in said conduit, an anchoring ring for rigidly connecting the pipe to said conduit secured to said pipe and having a flange adapted to be secured between the ends of adjacent sections of the conduit.

6. A conduit for steam pipes and the like divided longitudinally into complementary sections, and flexible joints including longitudinally extending lead strips interposed between the adjoining edges of said sections and permitting independent expansion of the sections in accordance with temperature differences circumferentially of the conduit.

7. A conduit for steam pipes and the like divided longitudinally into complementary part sections so as to compensate for temperature differences in different parts of the conduit, and sealing joints between the edges of the complementary part sections including a gasket interposed between the inner parts of the edges and a lead insert calking the joint along the outer parts of the edges, the lead insert providing a flexible joint adapted to absorb circumferential expansion of the conduit and further providing for unequal longitudinal expansion of the complementary part sections.

8. A conduit for steam pipes and the like divided longitudinally into complementary part sections so as to compensate for temperature differences in different parts of the conduit, and sealing joints between the edges of the complementary part sections including a gasket interposed between the inner parts of the edges and a lead insert calking the joint along the outer parts of the edges, the edges outwardly of the gasket being recessed so that the lead strip may be of substantial and greater thickness than the gasket, the lead insert providing a flexible joint adapted to absorb circumferential expansion of the conduit and further providing for unequal longitudinal expansion of the complementary part sections.

MANUEL H. GYSLING.